(12) United States Patent
Schlansker et al.

(10) Patent No.: US 6,993,639 B2
(45) Date of Patent: Jan. 31, 2006

(54) PROCESSING INSTRUCTION ADDRESSED BY RECEIVED REMOTE INSTRUCTION AND GENERATING REMOTE INSTRUCTION TO RESPECTIVE OUTPUT PORT FOR ANOTHER CELL

(75) Inventors: Michael S. Schlansker, Los Altos, CA (US); Boon Seong Ang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 366 days.

(21) Appl. No.: 10/405,170

(22) Filed: Apr. 1, 2003

(65) Prior Publication Data

US 2004/0199745 A1 Oct. 7, 2004

(51) Int. Cl.
*G06F 15/82* (2006.01)
(52) U.S. Cl. .............................. 712/18; 712/21; 712/25; 712/201
(58) Field of Classification Search .................. 712/18, 712/25, 28, 201
See application file for complete search history.

(56) References Cited

U.S. PATENT DOCUMENTS 5,649,135 A * 7/1997 Pechanek et al. ........... 712/200

| | | | |
|---|---|---|---|
| 6,526,500 B1 * | 2/2003 | Yumoto et al. ............... 712/25 |
| 6,738,891 B2 * | 5/2004 | Fujii et al. ..................... 712/16 |
| 2004/0030871 A1 * | 2/2004 | Schlansker et al. ......... 712/233 |

OTHER PUBLICATIONS

The Transputer, Colin Whitby-Stevens, Sigarch Newsletter, vol. 13, Issue 3, Jun. 1985, ISSN: 0149-7111, pp. 292-300.
The Message-Driven Processor: A Multicomputer Processing Node with Efficient Mechanisms, William J. Dally et al., IEEE 1992, ISSN: 0272-1732/92/0400-0023, pp. 23-39.
A Variable Instruction Stream Extension to the VLIW Architecture, Andrew Wolfe et al., ACM 1991, Architecture Support for Programming Languages and Operating Systems, ISBN: 0-89791-380-9.

* cited by examiner

*Primary Examiner*—Kenneth S. Kim
(74) *Attorney, Agent, or Firm*—Tuan V. Ngo

(57) ABSTRACT

Embodiments of the invention relate to a processing cell for use in computing systems. Generally, a processing cell generates remote instructions to be received and processed by at least one other processing cell. A processing cell may include a program counter, an instruction memory, and appropriate elements such as a branch lookup, a branch unit, etc. Alternatively, the processing cell may include a state machine that replaces the program counter and the instruction memory. Embodiments of the invention are able to support the VLIW mode, the MIMD) mode, a mixture of both modes of execution, etc.

24 Claims, 10 Drawing Sheets

Basic Block B410 int x, y, z, s, q, r, p, w;
...
x = y/z;
s = q*r;
p = (s<3);
if (p){

Basic Block B420 w = x*x;
w = w*w;

} else {

Basic Block B430 s = s + q;
x = 2*x;

}

Basic Block B440 w = w+5;

*Fig. 6*

| TIME | BRANCH CELL 910 | BRANCH CELL 920 |
| --- | --- | --- |
| t | Read B[i]; (RAM 930(2)) | |
| t + 1 | Read A[i]; (RAM 930(1)) | Read B[j]; (RAM 930(2)) |
| t + 2 | (perform multiply) | Read B[j]; (RAM 930(2)) |
| t + 3 | Write C[i]; (RAM 930(1)) | (perform multiply) |
| t + 4 | Read B[i+1]; (RAM 930(2)) | Write C[j]; (RAM 930(1)) |
| t + 5 | Read A[i+1]; (RAM 930(1)) | Read B[j+1]; (RAM 930(2)) |
| t + 6 | (perform multiply) | Read A[j+1]; (RAM 930(1)) |
| t + 7 | Write C[i+1]; (RAM 930(1)) | (perform multiply) |
| t + 8 | Read B[i+2]; (RAM 930(2)) | Write C[j+1]; (RAM 930(1)) |
| t + 9 | Read A[i+2]; (RAM 930(1)) | Read B[j+2]; (RAM 930(2)) |
| t + 10 | (perform multiply) | Read A[j+2]; (RAM 930(1)) |

Fig. 10

PROCESSING INSTRUCTION ADDRESSED BY RECEIVED REMOTE INSTRUCTION AND GENERATING REMOTE INSTRUCTION TO RESPECTIVE OUTPUT PORT FOR ANOTHER CELL

FIELD OF THE INVENTION

The present invention relates generally to computing systems and, more specifically, to processing cells for use in such systems.

BACKGROUND OF THE INVENTION

Traditionally, to control computations on a microprocessor, the microprocessor is provided with a centralized instruction-issue unit and a branch unit. The instruction-issue unit issues instructions that control the cycle-by-cycle operations of the microprocessor's resources, while the branch unit steers execution in time, directs the flow of control, determines the sequence of instructions that should be issued, etc.

As chip density increases, emerging devices have the capacity to accommodate huge numbers of functional units, which can potentially deliver much higher performance than current devices. As the number of functional units, especially on programmable devices, increases, efficiently and flexibly controlling these devices raises various issues. In many situations, the centralized point of control in traditional microprocessors with branch units is inadequate for managing this vastly increased number of functional units. For example, to exploit thread-level parallelism, a computing platform has to track multiple flows of control. Traditional centralized architecture, with its single flow of control, is unable to do this.

Conventional MIMD (multiple instructions multiple data) machines also have limitations in supporting thread-level parallelism. These machines usually limit each thread of execution to a microprocessor because control between different processors of a MIMD machine is generally so decoupled as to make it difficult to statically orchestrate their execution. A highly-parallel thread is usually unable to make full use of parallelism because of insufficient hardware resources in each MIMD processor, resources that are normally fixed in hardware. Dynamically spawning the work to other processors on a MIMD machine is usually done at very coarse granularity. This is due to high overheads arising from dynamic coordination that is needed when a single logical thread is split into multiple actual threads, each running on a different processor of a MIMD machine. This misses opportunities for exploiting parallelism and efficient use of computing resources.

Multi-threaded control architectures, such as SMT (simultaneous multi-threading), support multiple flows of control that share a common pool of functional units, allow sharing of functional unit resources across multiple threads of control, etc. However, they usually adopt a centralized point of control and dynamic instruction issue coordination that have problems with implementation and scaling. As a result, they are generally unable to accommodate either a larger number of simultaneously executing threads or a large number of functional units.

Distributing control information from a centralized control becomes worse with large, faster chips. With faster clock speed, there is less time for signals to propagate each cycle. With smaller silicon having narrower and taller wires, signal propagation speed along these wires deteriorates. Under centralized control architecture, all these signals need to be brought to the central point, which causes a scaling bottleneck.

Based on the foregoing, it is desirable that mechanisms be provided to solve the above deficiencies and related problems.

SUMMARY OF THE INVENTION

The present invention, in various embodiments, is related to a processing cell for use in computing systems. Generally, a processing cell generates branch commands or instructions to be received and processed by at least one other processing cell. A processing cell may be instruction-based that includes a program counter, an instruction memory, and appropriate elements such as a branch lookup, a branch unit, an ALU, etc., for computations. Alternatively, the processing cell is state-machine based, which is comparable to an instruction-based cell, but includes a state machine that replaces the program counter and the instruction memory. Embodiments of the invention are able to support at least the VLIW (Very Long Instruction Word) mode, the MIMD (Multiple Instructions Multiple Data) mode, and a mixture of both modes of execution.

BRIEF DESCRIPTION OF THE DRAWINGS

The present invention is illustrated by way of example, and not by way of limitation, in the figures of the accompanying drawings in which like reference numerals refer to similar elements and in which:

FIG. 6 shows a second piece of programming code to be implemented on the processing system of FIG. 3, in accordance with an embodiment;

FIG. 10 shows a schedule used in the example of FIGS. 8 and 9, in accordance with an embodiment.

DETAILED DESCRIPTION OF THE PREFERRED EMBODIMENT

In the following description, for the purposes of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid obscuring the invention.

Processing Cell—Instruction Base

Figure 1A:
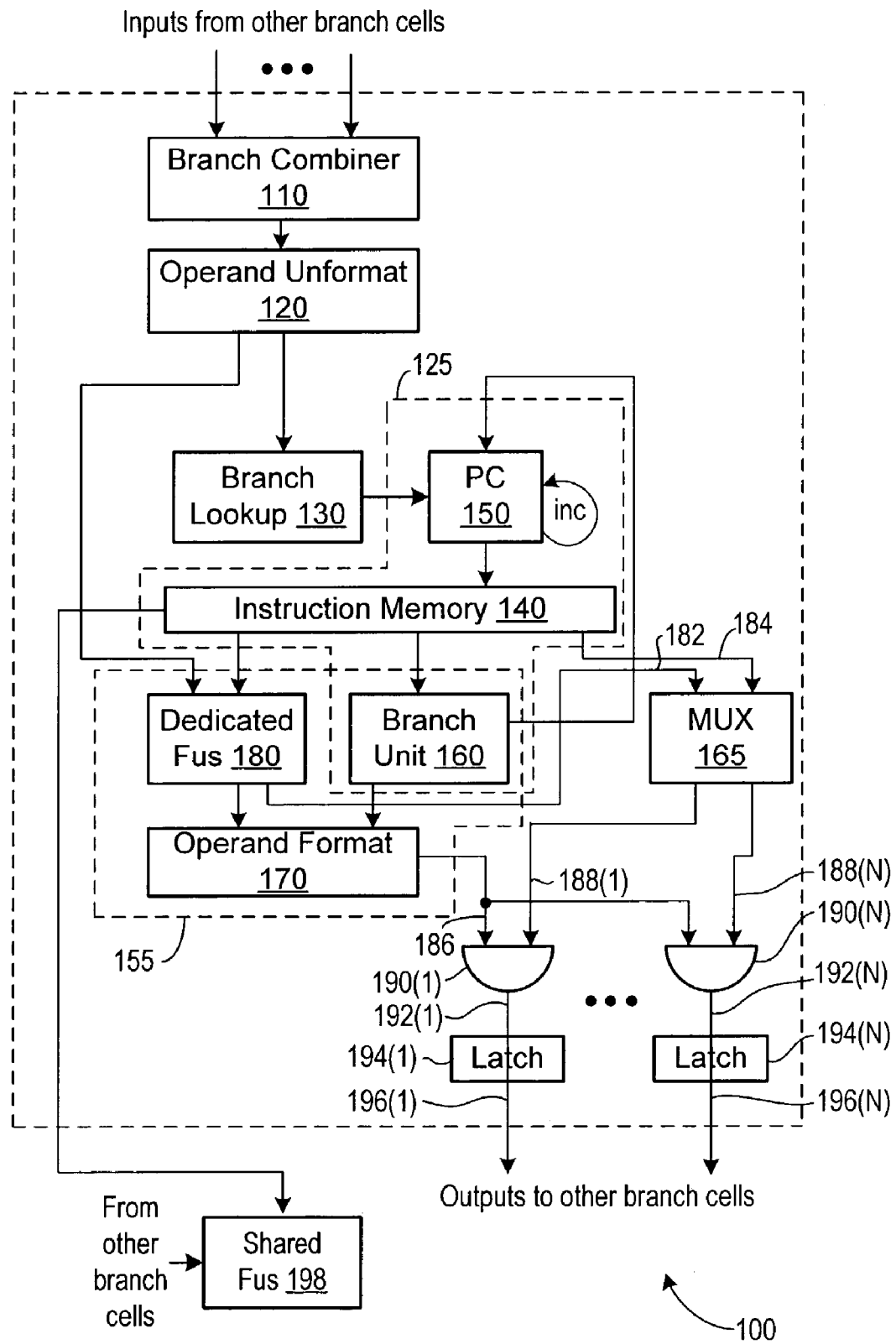
FIG. 1A shows a processing cell with an instruction-based control, in accordance with an embodiment.

FIG. 1A shows a processing cell 100 with an instruction-based control, in accordance with an embodiment. Processing cell 100 may be referred to as a processing element, a processor, a processor with enhanced features, or their equivalence. Processing cell 100 includes a branch combiner 110, an operand un-format 120, a branch lookup 130, an instruction memory 140, a program counter 150, a branch unit 160, an operand format 170, dedicated functional units 180, a plurality of AND gates 190, and a plurality of latches 194.

Branch combiner or input combiner 110 receives information, e.g., commands, instructions, etc., from normally other processing cells. These commands or instructions that are received from and/or sent to other processing cells may be referred to as remote commands or remote instructions. Branch combiner 110 may merge these remote commands as appropriate. Inputs to branch combiner 110 generally come from outputs, e.g., AND gates 190 and latches 194, of other processing cells. Depending on implementations, branch combiner 110 can be an OR gate, which relies on static scheduling to ensure that collisions will not happen at this OR gate or that any collision is pre-planned and OR-ing colliding branch commands results in a valid, desired branch command. Alternatively, branch combiner 110 includes an intelligent element that, based on defined rules and/or priorities, selects a desired input. In general, branch combiner 110 selects the highest priority request for further propagation into processing cell 100. Prioritization may be fixed, i.e., requests of some inputs have higher priority than those of other inputs, or may be dynamic, such as in a round-robin scheme that round-robins the highest priority between different inputs. Alternatively, each input command is tagged with a priority. Branch combiner 110 then selects a command tagged with the highest priority.

When a valid branch command is received, operand un-format 120 decodes and parses the command to extract a branch target tag. In an embodiment, the branch target tag is "virtual" in that it indirectly references instruction memory 140. The virtual branch target tag is used as an input to branch lookup 130. If the lookup succeeds, branch lookup 130 returns a local, physical branch target address that directly references instruction memory 140. This physical branch target address is then inserted into program counter 150, causing execution of the processing cell to jump to that physical branch target address and continue from there. In addition to extracting the branch target tag, operand un-format 120 makes the full content of a branch command accessible to dedicated functional units 180, so that information carried in an in-coming branch command can be incorporated into local computations.

Normally, an externally initiated branch command has higher priority than a local branch or an instruction incremented by the local program counter 150. Thus, a branch command from outside a processing cell 100 causes control flow to jump to the branch-tag-specified location. In one mode of usage, a processing cell 100 sits in an idle loop while waiting for external branch commands, with loop-back implemented with a local branch instruction. Thus, having the externally initiated branch command takes precedence over local branch and normal increment of local program counter serves to initiate new computation at the processing cell. In other uses, such as in some parallel searches, the ability of an externally initiated branch command to interrupt local execution may be used to abort local computations. For example, multiple threads are employed with each working on a different portion of the overall search. Once a solution is found, the problem is solved and threads that are still searching should be aborted. An external branch can be used to implement the abort.

Using a virtual branch target tag confers the flexibility of placing instructions in each processing cell independently. In one usage of this invention, a branch command is multicast to multiple target processing cells that collaborate on a computation. By using a virtual branch target tag and performing a lookup to find the actual location of the branch target instruction in local memory 140 of each target processing cell, the physical location of the target instruction can be different in each processing cell 100, while accommodating a common branch target name that is multicast to all the target processing cells.

In contrast, in systems that do not use virtual branch target tag and branch target lookup, multicasting a branch instruction to multiple target processing cells desires that the target instructions be located at the same memory address in every target processing cell. In general, each processing cell executes a different number of instructions between branch target instructions. Aligning VLIW branch targets on different processing cells thus pads instruction memory 140 with no-op (no operation) instructions, resulting in inefficient use of instruction memory 140. By using virtual branch target tag and translation through table lookup, various processing cells, e.g., in the same VLIW cluster, receive the same virtual branch target name, but do not necessarily branch to the same local branch target address. The layout of instruction memory 140 can be different for each processing cell and each processing cell can therefore use its instruction memory 140 efficiently.

In some embodiments, branch lookup table 130 is an associative memory that contains only desirable entries, e.g., entries in which a branch results in useful work within the processing cell. Alternatively, branch lookup table 130 is a table indexed with the branch target name and contains the branch target address. Lookup table 130 thus translates a virtual branch target name to a physical, local branch target address.

Instruction memory 140 holds instructions to be executed. Normally, instructions in instruction memory 140 are in the form of a byte or a word, and include a field from which the instructions are decoded. Instructions issued from instruction memory 140 generally control dedicated functional units 180 that are solely under the control of a processing cell or shared functional units 198 that are jointly controlled by multiple processing cells.

Program counter 150, like program counters in conventional microprocessors, keeps track of the next instruction to be issued. In general, program counter 150 is incremented to execute instructions one after another in the order laid out in instruction memory 140. However, when a branch instruction is encountered, program counter 150 points to a location specified by that branch instruction. Typically, a branch instruction has a field that provides program counter 150 with a value determining the branch location.

Branch unit 160 decides a destination for a branch command, and supports both local and remote commands. In general, local commands are executed within processing cell 100 while remote commands are sent to outside of processing cell 100, e.g., to another processing cell. Branch unit 160 directs a local branch to program counter 150 for execution, and composes a remote branch command that is eventually sent to AND gates 190 to be output to one or more other cells. A remote branch command is normally passed to operand format 170. Generally, instruction memory 140, program counter 150, and branch unit 160 control instructions processed by processing cell 100 and may be referred to as instruction controller 125.

Operand format 170, branch unit 160, and dedicated functional units 180 form remote branch commands. Consequently, branch unit 160, operand format 170, and functional units 180, as a whole, may be referred to as a remote command or remote instruction generator 155. Operand format 170 assembles bits supplied by the branch unit 160 and dedicated functional units 180 into a branch command. In an embodiment, branch unit 160 supplies the bits representing the virtual branch target tag, while dedicated functional units 180 supply operands carried with the remote branch command. In another embodiment, branch unit 160 makes the decision to issue a remote branch, but dedicated functional units 180 supply the branch target tag. Remote branch commands generated through operand format 170 propagate through AND gates 190 controlled by output steering bits on lines 188 supplied by instructions from instruction memory 140, and arrive at the appropriate processing cell destinations.

Data received from another processing cell may be used in part or in whole to form a new branch command. Operand un-format 120 makes that data accessible to dedicated functional units 180. Alternatively, a new branch command may be assembled from scratch. Once formed, a new branch command may be sent to one or more output ports, e.g., AND gates 190, under instruction or data control. In an embodiment, the instruction bits, in the form of the output steering bits on lines 184, directly specify the selected destinations. Alternatively, dedicated functional units 180 provide the destinations, through control bits on lines 182. In both cases, an output steering control mux 165 selects between instruction bits on line 182 and data bits on line 184 as the output steering bits 188 for controlling the output AND gates 190. In the absence of hardware support for control of output ports by data value from dedicated functional units 180, the same effect can be achieved indirectly by using the data as selector in a case statement. Program instructions in instruction memory 140 is set up for the case statement so that each case invokes a remote branch instruction with the appropriate output ports enabled.

Dedicated functional units 180 process instructions such as performing loads, stores, arithmetic operations, etc., within a processing cell.

The outputs of AND gates 190 may be referred to as output ports, and the number of AND gates 190 varies depending the topology of processing cell 100. Adding or subtracting AND gates 190 adds or subtracts output ports to processing cell 100. Each AND gate 190 determines whether a message on line 186 propagates to a line 192 and thus output 196. If an AND gate 190 is enabled, then the message can propagate through that AND gate 190 and latch 194, to its corresponding output 196. Conversely, if an AND gate 190 is disabled, then the message cannot propagate through that AND gate. Each AND gate 190 is controlled, i.e., enabled, disabled, configured, etc., by a bit-vector or output steering bits on lines 188, supplied by instructions read out of instruction memory 140 or supplied by dedicated functional units 180. Configuring, e.g., setting/resetting, the bit corresponding to an AND gate enables/disables that AND gate. For example, four bits B1, B2, B3, and B4 of a bit vector V1 corresponding to four AND gates 190(1), 190(2), 190(3), and 190(4), respectively, and, if bit B1 is set while bits B2, B3, and B4 are reset, then only AND gate 190(1) is enabled while AND gates 190(2), 190(3), and 190(4) are disabled. As a result, because only AND gate 190(1) is enabled, data is only sent to line 192(1) and to input of another processing cell connected to this AND gate 190(1).

Latches 194 latch data on line 192 to line 196, and is useful in pipelining, a technique that allows for high-clock speed. Pipelining divides a long combinational logic path into several segments or stages, separated by latches. As a result, signals only have to pass through shorter combinational paths between neighboring latches, resulting in faster system clocks and thus higher throughput because multiple instances of the messages traversing a processing cell can be in progress, each occupying a different stage of the pipeline. A latch 194 thus allows more messages to be in flight at the same time, each in a different level of the pipeline stage. Latches 194 may be eliminated to reduce the number of clock cycles. Conversely, additional level of latches may be added to a processing cell as appropriate, such as to allow for higher clock speed.

Outputs on lines 196 provide information or messages to another processing cell, e.g., via branch combiner 110 of that processing cell.

Shared functional units 198 are jointly controlled by more than one processing cell such as when some resources used in a system utilizing the processing cells are shared between the processing cells. For example, a FIFO (first-in-first-out) queue connects two neighboring processing cells in which one processing cell inserts data into the FIFO while another processing cell removes data from it. Both processing cells may also monitor the status of the FIFO queue, e.g., how full or empty it is, etc.

Processing Cell—State-Machine-Based Control

Figure 1B:
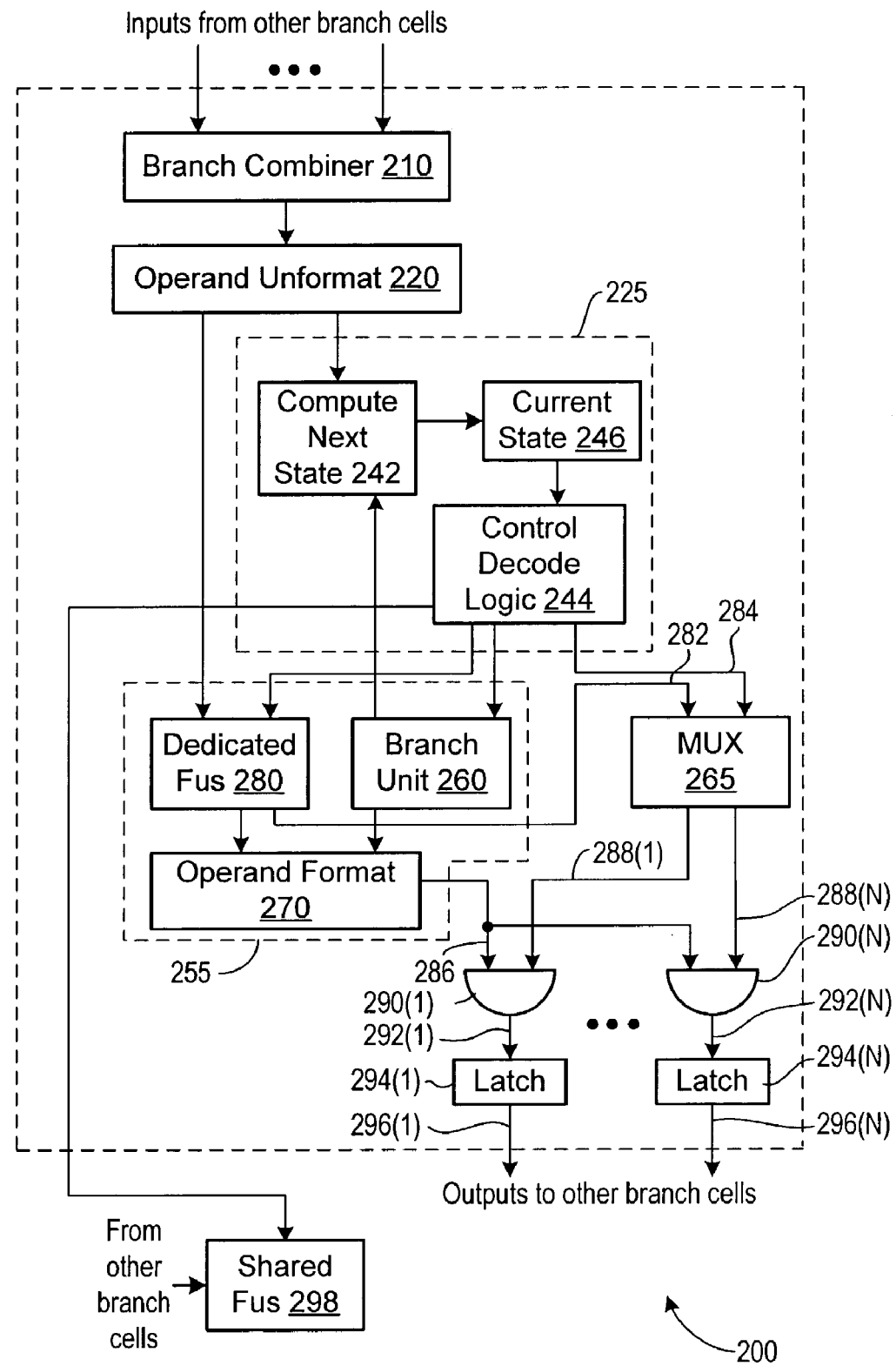
FIG. 1B shows a processing cell with a state-machine based control, in accordance with an embodiment.

FIG. 1B shows a processing cell 200 with a state-machine based control, in accordance with an embodiment. Processing cell 200, like processing cell 100, may be referred to as a processing element, a processor, a microprocessor with enhanced capabilities, or their equivalence. Processing cell 200 is comparable to processing cell 100, but includes a state machine 225 that replaces program counter 150 and instruction memory 140 of processing cell 100. As a result, processing cell 200, besides state machine 225, comprises a branch combiner 210, an operand un-format 220, dedicated functional units 280, an operand format 270, AND gates 290 and latches 294. Branch combiners 110 and 210, operand un-formats 120 and 220, branch units 160 and 260, operand formats 170 and 270, dedicated functional units 180 and 280, AND gates 190 and 290, and latches 194 and 294, are comparable. Like processing cell 100, processing cell 200 may also control shared functional units 298 that are comparable to shared functional units 198.

State machine 225 includes next state logic 242, current state logic 246, and control decode logic 244, that, together, provide the current state and future state of state machine 225. Current state logic 246 encodes the present state, determines what should be done presently, and provides the context from which next state logic 242 determines future control actions. Control decode logic 244 takes as input the current state's value, and from that generates control signals that are used to control the operations of branch unit 260, dedicated functional units 280, shared functional units 298, and output AND gates 290. Next state logic 242, considering the current state and branch commands, decides the state that state machine 225 should be in next. Branch commands may be local, e.g., conveyed by local branch unit 260, or remote, e.g., externally generated by another processing cell and arrive via branch combiner 210 and operand un-format 220.

In the following text, the term processing cell or processing cell 100 is applicable to processing cell 200.

Functions of a Processing Cell

A processing cell may implement local control that performs computation in response to incoming requests. Alternatively, a processing cell can also send branch commands to, and thus invoke execution on, other processing cells. A collection of processing cells that collaborate in a tightly coupled, statically scheduled manner may operate as one logical thread. Execution on one processing cell with a known fixed timing relationship with execution on another cell allows coordination between the cells to be done statically and thus avoid run-time synchronization costs.

Sometimes, parallelism in an application comes in the form of thread parallelism. In these situations, static coordination between the multiple threads is not possible. Instead, multiple logical threads of execution are desired, with each thread of control making its own branching decisions such that it is impossible to predetermine a fixed timing relationship between different threads' execution. Various embodiments of the present invention can accommodate thread level parallelism. Each processing cell can run a separate thread of control. A processing cell has sufficient local control resources to implement local control sequencing and local branching, and can therefore operate independently.

By equipping each processing cell with flexible remote branch initiation and reception capabilities, allocating processing cell granularity resources to logical thread can change rapidly with little run-time overhead. Sending an appropriate remote branch command to a processing cell enables a logical thread to start using that processing cell to execute part of its workload. The remote branch command specifies as it branch target tag a value that refers to code that the thread wants executed on that processing cell.

Figure 2:
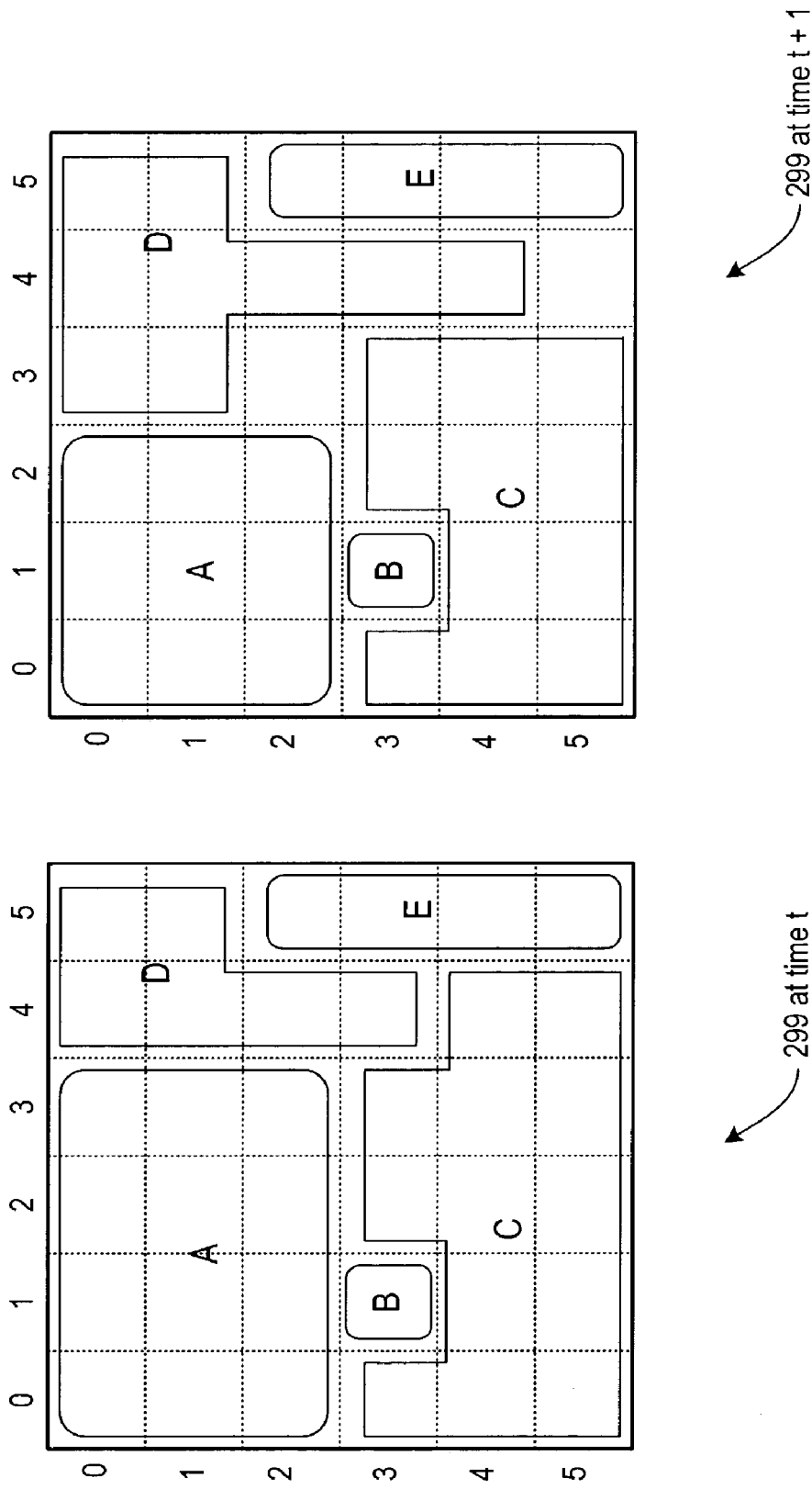
FIG. 2 shows how processing cells are re-allocated between logical threads, in accordance with an embodiment.

FIG. 2 shows a processing system or device 299 with 36 processing cells laid out in a 2-dimension grid to illustrate how processing cells are re-allocated rapidly between logical threads. A coordinate (x, y) refers to a processing cell at a row x and a column y. At time t, five logical threads A, B, C, D, and E are running on device 299. Logical thread A uses twelve processing cells (0,0), (0,1), (0,2), (0,3), (1,0), (1,1), (1,2), (1,3), (2,0), (2,1), (2,2), and (2,3). Logical thread B uses one processing cell (3, 1). Logical thread C uses 13 processing cells, (3,0), (3,2), (3,3), (4,0), (4,1), (4,2), (4,3), (4,4), (5,0), (5,1), (5,2), (5,3) and (5,4). Logical thread D uses six processing cells (0,4), (0,5), (1,4), (1,5), (2,4), (3,4), and logical thread E uses four processing cells (2,5), (3,5), (4,5), and (5,5). At the end of time t, logical thread A finishes using processing cells (0,3), (1,3), and (2,3), while logical thread C finishes using processing cells (4,4) and (5,4). Depending on implementations, those processing cells that are no longer used in a logical thread may execute a halt instruction after their last instruction.

For further illustration purposes, logical thread D expands its execution to include execution on processing cells (0,3), (1,3) and (4,4), and does this by sending a remote branch command, at time t, from processing cell (1,4) to processing cells (0,3) and (1,3), and from processing cell (3,4) to processing cell (4,4). Assuming that a remote branch command takes one cycle to reach a neighboring cell, and each cell's output is directly connected to the nearest eight neighbors, the remote branch commands from cell (1,4) arrive at cells (0,3) and (1,3) at time (t+1) while the remote branch command from processing cell (3,4) arrives at processing cell (4,4) at time (t+1). These target processing cells then begin to execute code that is part of logical thread D.

A processing cell can receive information and pass it to the next cell without processing that information. For example, the receiving cell, upon receiving the information, issues a remote branch instruction to relay the information to a destination cell along a propagation chain. As an example, at least two cells are stacked together so that, as appropriate, one cell is responsible for passing the information, and the other cell is responsible for processing, e.g., performing arithmetic operations on the information.

The Remote Branch Command

A remote branch command may be useful as means to implement remote function invocation. Sending a remote branch command to a target processing cell invokes the function call. Input data in the form of function call parameters may be supplied, e.g., bundled with the remote branch command. Typically, a function invocation is marked by a call followed by a return. The return serves as a control-flow event that marks the end of the invocation so that appropriate subsequent execution can begin. The return may also serve to convey return results. Embodiments of this invention allow invocation return to happen in one of several ways.

When it is possible to predetermine an upper bound on the execution time of the called function, the invocation return may be implicit and silent, i.e., with no explicit actions triggering subsequent execution. Instead, the invoking thread can time the execution and initiate subsequent execution upon reaching the predetermined execution time upper bound. The processing cell executing the invoked function simply finishes what it is asked to do, and continues with other tasks or simply halts. Return results may be left by the callee in memory locations accessible by both the caller and the callee. Normally, the caller accesses these locations after waiting for the invoked function's predetermined maximum execution time. The caller, while waiting, can perform other tasks.

Alternatively, the target processing cell sends a remote branch command to the caller when it is done executing the invoked function. The arrival of this second remote branch command at a caller processing cell triggers execution of code that should begin after the function invocation. Returned results may be bundled with this remote branch command.

For a called function to be invoked from multiple callers, in an embodiment, each call supplies a return address with a remote branch command that makes the function call. The return address is used to determine where to send the reply remote branch command. For example, the return address is used to select which output ports to send the reply command to. In the case of processing cells connected by switched network connection, part of the return address may be used as a "return route" on the reply and used by the switches to dynamically route the reply to its destination. In an embodiment, operand un-format 120 makes the return address available to dedicated functional units 180, which use this return address to form the appropriate reply by operand format 170, and to select appropriate output ports.

Processing Cell Connections

Processing cells may be connected in various ways. However, the invention is not limited to any one way of connection. Wires may directly connect processing cells to form hardwired interconnections. For example, a processing cell having four sets of outputs, each set being connected to a set of inputs of four north, west, south, and east neighboring cells. Alternatively, field programmable wires that are statically reconfigurable to form different interconnections may connect processing cells. This uses programmable wire technologies in which programmable switches, usually in the form of a pass gate, separate segments of wires. These switches are then controlled by RAM based configuration bits that determine whether switches are closed or open. Using reconfigurable wires allow the neighbor of each processing cell to be changed through reprograms, which is helpful in situations such as when a processing cell may need to interact with a different set of other processing cells, e.g., in running different applications or during different phases of an application.

Processing cells may be connected through interconnection switches. The interconnect switches route each branch command dynamically, using either additional destination or route information carried on each branch command, or internal state information kept at each interconnection switch.

A processing cell may be implemented to form an interconnection switch, in which this processing cell runs a program that forwards an incoming command to one or more destinations.

FIRST EXAMPLE USING PROCESSING CELLS

Figures 3, 4:
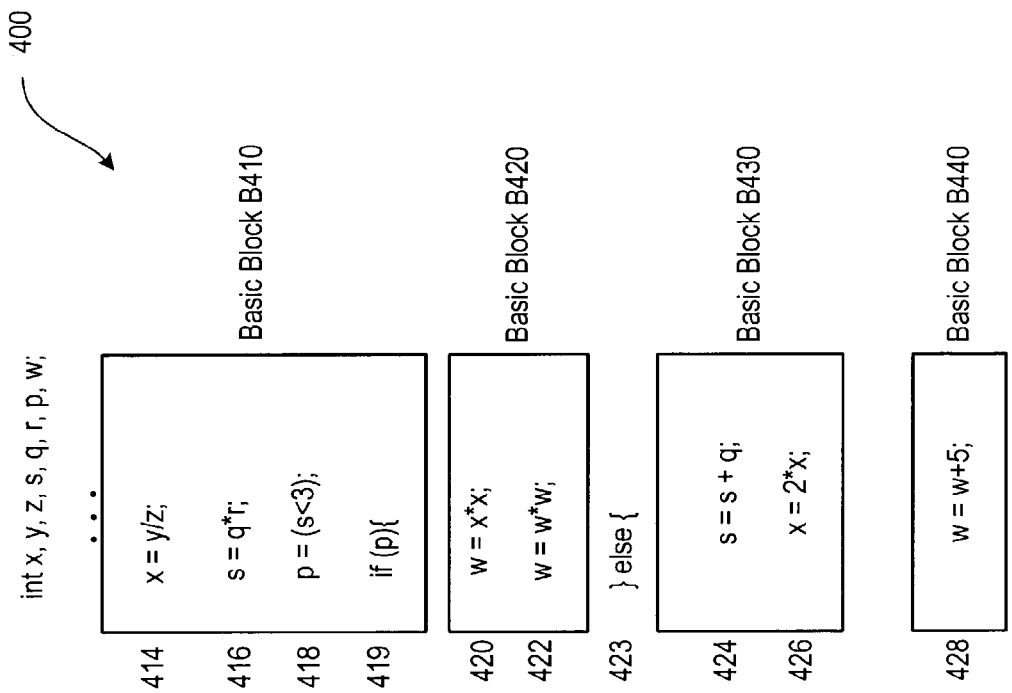
FIG. 3 shows a processing system using processing cells, in accordance with an embodiment.
FIG. 4 shows a first piece of programming code to be implemented on the processing system of FIG. 3, in accordance with an embodiment.

FIG. 3 shows a processing system 300 that includes three processing cells 310, 320, and 330 being embodiments of a processing cell 100 and/or 200, in accordance with an embodiment. Processing cell 320 is to the west of processing cell 330 while processing cell 310 is to the west of processing cell 320. For illustration purposes, system 300 implements an exemplary piece of programming code 400 in FIG. 4.

FIG. 4 shows a piece of programming code 400 that include four basic blocks B410, B420, B430, and B440. Conceptually, a basic block includes instruction code that is to be executed sequentially and without a transfer control. Once execution begins at a basic block, all instructions within the basic block will be executed. Further, a basic block starts after a branch command or at the target of a branch command, and ends before another branch command or another branch command target.

In FIG. 4's example, lines 414 to 419 constitute basic block B410 that ends with a branch, e.g., an "if" statement on line 419. Lines 420 to 422 constitute basic block B420, which starts after the "if" statement on line 419 and ends before the "else" statement on line 423. Lines 424 to 426 constitute basic block B430, which starts after the "else" statement on line 423 and ends before the end of the "else" block on line 427, and line 428 constitutes basic block B440. For illustrative purposes, lines 414, 420, and 426, are executed in processing cell 310. Lines 422 and 428 are executed in processing cell 320, and lines 416, 418, and 424 are executed in processing cell 330.

Figure 5:
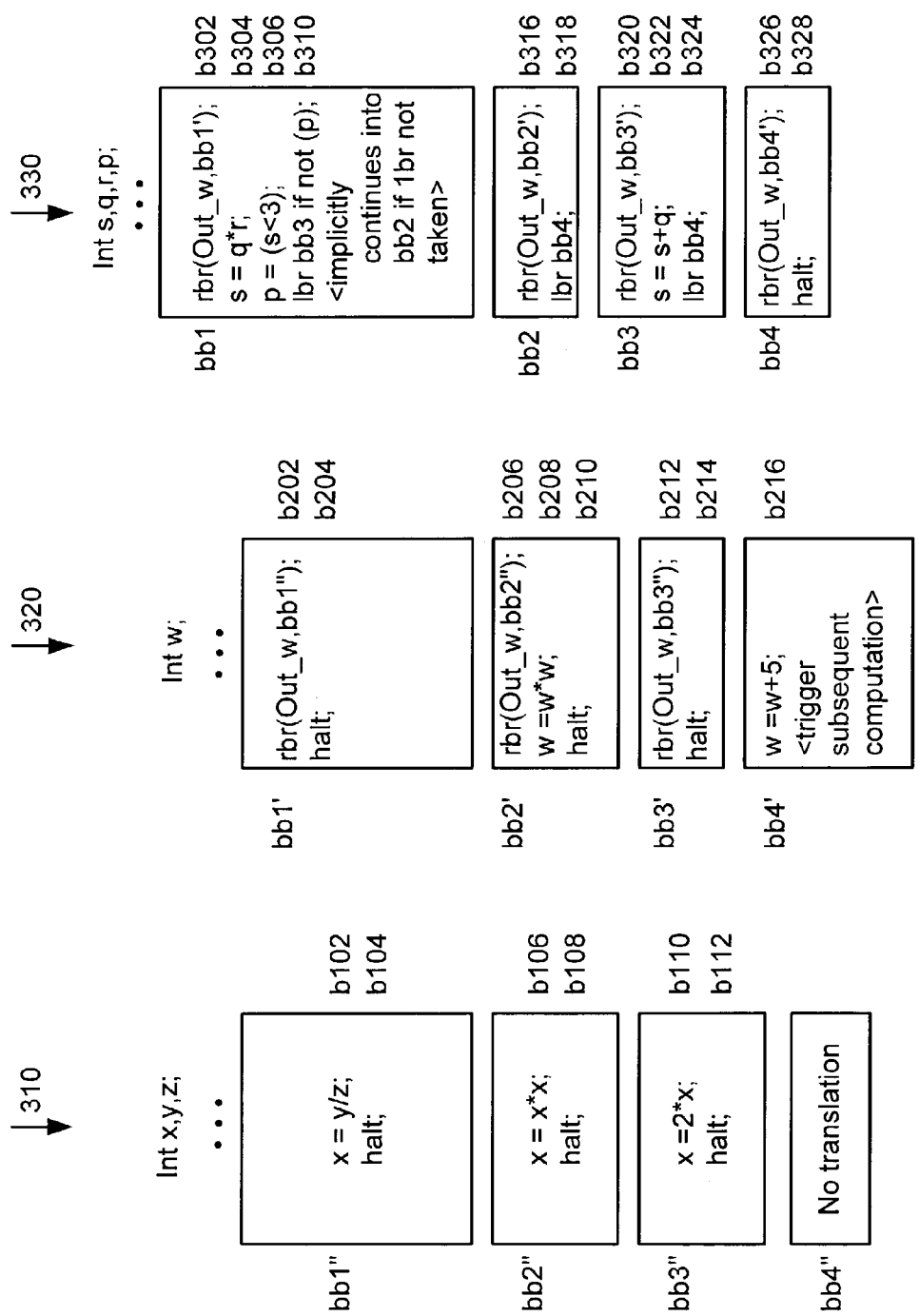
FIG. 5 shows a processing system of FIG. 3 implemented with the programming code of FIG. 4, in accordance with an embodiment.

FIG. 5 shows a system 500 illustrating how code 400 in FIG. 4 is implemented in processing cells 310, 320, and 330 of system 300. Code 400 in FIG. 4 constitutes a logical thread that is executed on these three processing cells 310, 320, and 330. Instruction blocks bb1 of processing cell 330, bb1' of processing cell 320 and bb1" of processing cell 310 correspond to basic block B410. Similarly, blocks bb2, bb2', and bb2" correspond to basic block B420; blocks bb3, bb3', and bb3' correspond to basic block B430; and blocks bb4, bb4', and bb4" correspond to basic block B440.

FIG. 5 shows that, besides the original code in FIG. 4, cells 310, 320, and 330 have additional "coordination" code for coordinating execution of code 400. For example, the "halt" instruction on lines b104, b108, b204, etc., the "rbr" (remote branch) instruction on line b202, b206, b302, etc., and the "lbr" (local branch) instruction on lines b310, b314, b318, etc., are "control coordination" code. A "halt" instruction halts execution of the program.

A "rbr" instruction sends a remote branch command to one or more processing cells, with a virtual branch target tag that identifies the code to be invoked at the destination(s). The "rbr" instruction may also carry additional data. In this example, because processing cell 330 controls execution of processing cells 320 and 310 when execution is initiated for basic blocks 410, 420 and 430, processing cell 330 is the origin of several chains of remote branch commands. For example, processing cell 330 issues the command "rbr (out_w, bb1')" on line b302, and sends this command to processing cell 320 on its west. The parameter "bb1'" in the command specifies the address for the target processing cell to start executing at virtual address or block "bb1'".

The "lbr addr" instruction is a local branch instruction that transfers local execution to an address "addr" in the same processing cell.

Coordination code is added during implementation of code 400 onto processing cells 310, 320, and 330. Different entities such as a system engineer, a compiler, a computer, etc., may implement code 400 onto processing cells 310, 320, and 330. In coming up with the actual code that runs on cells 310, 320 and 300, consideration is given to the relative timing to ensure that the resulting execution is in harmony with code 400. For example, external remote branch commands arriving at a target are arranged so that they do not prematurely terminate execution at the target processing cell. However, to simplify the explanation, detailed timing consideration is not explicitly mentioned in most cases in the following texts.

For illustration purposes, execution of the example in FIG. 5 starts at processing cell 330. However, since the instruction "x=y/z" is to be executed on line b102 in processing cell 310, processing cell 330 issues appropriate commands for that to happen. Processing cell 330, on line b302, issues a command "rbr" to processing cell 320, which, in turn, sends another "rbr" command on line b202 to processing cell 310. Because processing cell 320 is on the west side of processing cell 330, processing cell 330 specifies the "out_w" parameter for the command to be sent to the west cell. Processing cell 330 also specifies the virtual branch target address "bb1'". Processing cell 330 then continues to execute instructions "s=q*r","p=(s<3)", and "lbr bb3 if not(p)", on lines b304 to b310. These instructions correspond to lines 416, 418, 419, and 425 in FIG. 4.

Within processing cell 330, the "rbr" instruction on line b302 resides in instruction memory 140 at a local physical address, e.g., address la302. The instruction is issued when program counter 150 of processing cell 330 references address la302. Once issued, the instruction is forwarded to branch unit 160 for execution. Branch unit 160 identifies instruction "rbr" as a remote branch command, and thus forwards parameter "bb1'", a literal in this "rbr" instruction, to operand format 170. At the same time, the "out_w" parameter from the instruction is forwarded directly from instruction memory 140 to output AND gates 190 as output steering bits to control output propagation. In this example, only the AND gate 190 that connects cell 330 to its western neighbor, i.e., cell 320, is enabled.

Instructions on lines b304 and b306 are issued in a similar fashion, but are forwarded to functional units within dedicated functional units 180. Finally, the instruction on line b310 is issued to branch unit 160, which conditionally executes it, i.e. if (p) is not true, then the local branch succeeds and the branch target address is sent to program counter 150. In some embodiments, branch unit 160 contains predicate registers to hold values such as p. The result of a compare instruction, such as the one on line b306 is thus forwarded from dedicated functional units 180 to branch unit 160 for storage. In other implementations, the value of p is stored in a general-purpose register file within dedicated functional units 180. In that case, the value p stored there is read out when a conditional branch instruction is issued, and forwarded to branch unit 160.

Regarding basic block 420, since the instruction "x=x*x" is to be executed by processing cell 310 at address bb2" on line b106, processing cell 330 issues appropriate commands for that to happen. Execution on processing cell 330 enters block bb2 when the conditional local branch on line b310 results in an untaken branch, and local execution proceeds sequentially into block bb2. At address bb2 on line b316, processing cell 330 issues a command "rbr (out_w, bb2')" to trigger execution at address bb2' on processing cell 320. At address bb2' on line b206, processing cell 320 in turns issues a command "rbr (out_w, bb2")" to initiate execution at address bb2" on processing cell 310. Finally, the instruction x=x*x on line b106 is executed at address bb2' of processing cell 310.

Similar to the instructions "x=y/z" and "x=x*x," since the instruction "x=2*x" on line b110 is to be executed by processing cell 310, processing cell 330 issues appropriate commands for that to happen. Execution on processing cell 330 is transferred to block bb3 when the conditional local branch command "lbr bb3 if not(p)" finds p to be false, and thus results in a taken branch. At the branch target bb3, processing cell 330 sends a command "rbr" to initiate execution at address bb3'on processing cell 320. Processing cell 320 in turn issues a command "rbr" on line b212 to trigger execution at address bb3" on processing cell 310, which then executes the instruction "x=2*x."

In the above example, processing cell 320 and 310 do not participate in the local branching decision of processing cell 330, e.g., when processing cell 330 issues the commands "lbr bb3 if not(p)" on line b310. Processing cell 320, at address bb1' on line b202, relays information received from processing cell 330 to processing cell 310, without acting on the received information. In addition, in some cases, processing cell 320, as a receiving processing cell, also performs its own tasks, e.g., executing the instruction "w=w*w" on line b208, after initiating the remote branch command "rbr" on line b206. Processing cell 330 stops its execution by issuing the "halt" command on line b328.

Block bb4" showing no instruction indicates that processing cell 310 has no role in this block bb4". As a result, performing a lookup table in processing cell 310 for block bb4" will result in a failure to find a match, in which case the remote branch command has no effect.

The above example also uses static timing analysis and schedule, as opposed to dynamic synchronization, to ensure that execution of a block is completed before a new remote branch command arrives. For example, execution of block bb1" of processing cell 310 is complete before the command to trigger execution of block bb2" on the same processing cell 310 arrives. In coming up with an appropriate schedule, the compiler or a human coder may have to delay initiating a remote branch command to ensure that it does not arrive prematurely.

The above example also illustrates the concept of micro-threading. Whereas the original code 400 in FIG. 4 comprises of one logical thread, the actual implementation utilizes up to three processing cells, with each processing cell executing one or more micro-thread. Generally, a micro-thread is triggered by an arriving remote branch command and terminates at a "halt" instruction. Thus FIG. 5 shows code representing one micro-thread on processing cell 330, 4 micro-threads on processing cell 320, and 3 micro-threads on processing cell 310.

SECOND EXAMPLE ILLUSTRATING DATA BEING TRANSFERRED FROM A PROCESSING CELL TO ANOTHER PROCESSING CELL

FIG. 6 shows a piece of code 600 that works with a processing system 700 to illustrate data being transferred from a processing cell to another processing cell. As compared to code 400, the instruction "x=x*x" on line 420 in FIG. 4 has been changed to "x=x*s" on line 620.

Figure 7:
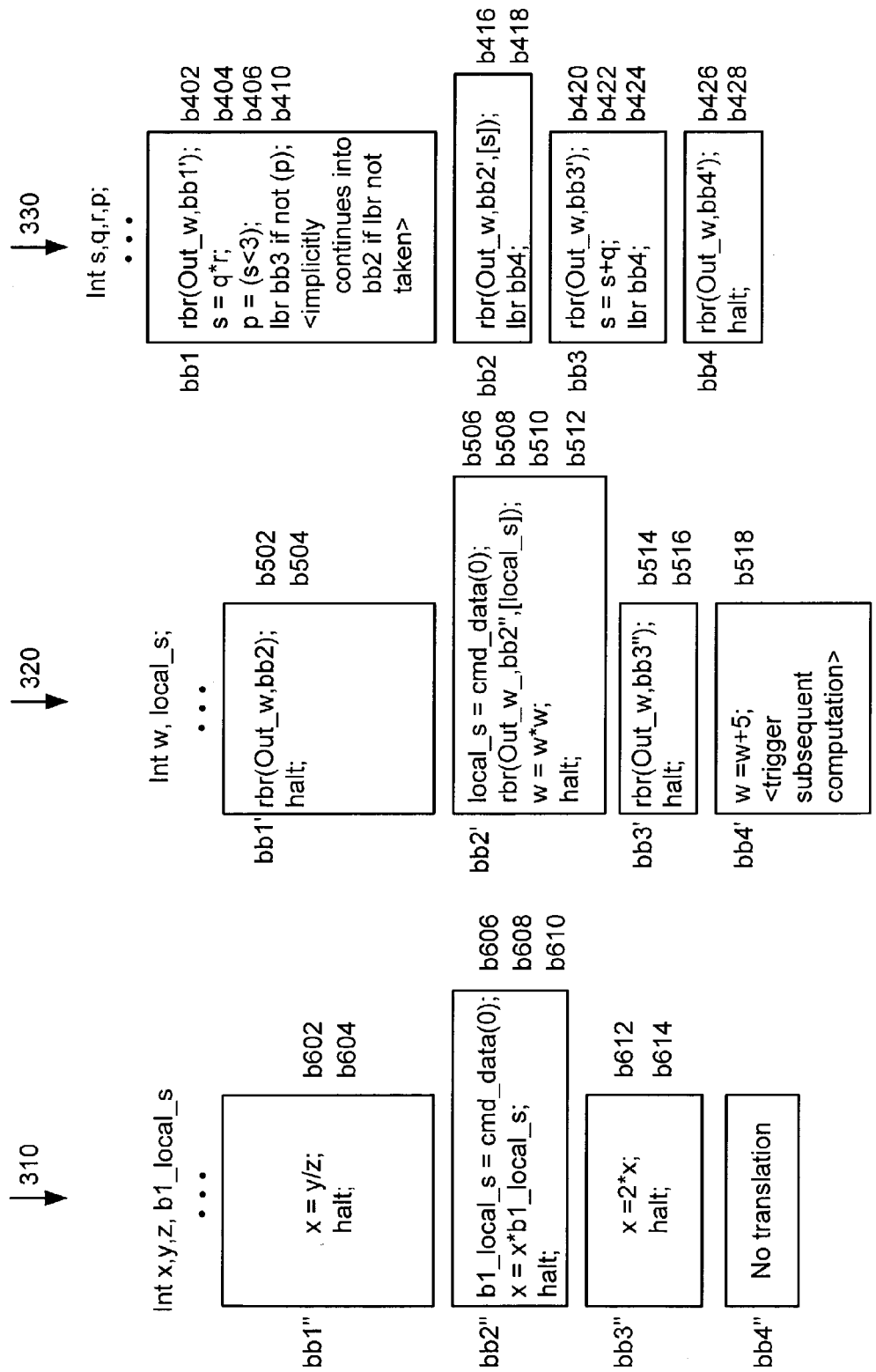
FIG. 7 shows a processing system of FIG. 3 implemented with the programming code of FIG. 6, in accordance with an embodiment.

FIG. 7 shows a system 700 illustrating how code 600 is implemented on processing cells 310, 320, and 330 of system 300. In this example, variable "s" is calculated on line b404 in block bb1 of processing cell 330. However, variable "s" is also used on line b608 in block bb2" of processing cell 310. Processing cell 330 thus issues commands to transfer the value of variable "s" from processing cell 330 to block bb2" of processing cell 310. Consequently, processing cell 330 on line b416 issues a command "rbr (out_w, bb2',[s])" that sends a remote branch command to trigger execution at address bb2' on processing cell 320. In addition, the value of variable "s" is also bundled into the command "rbr." Processing cell 320 on line b506 issues a command "b2_local_s=cmd_data(0)" to initialize the local variable b2_local_s with the value "s", which is the $0^{th}$ data parameter carried by the most recently arrived remote branch command to processing cell 320.

To further relay the value of variable "s" to processing cell 310, processing cell 320 on line b508 issues a command "rbr (out_w, bb2, [b2_local_s])" to send a remote command, with the data value "b2_local_s", to processing cell 310 where it triggers execution at address bb2". Processing cell 310, on line b606, extracts the value of variable "s" with a "cmd_data" instruction, and stores that value in the local variable b1_local_s. Finally this value is used in the instruction "x=x*b1_local_s" on line b608.

The instruction "cmd_data" is used to select data from among those stored in operand un-format 120. Upon receiving a remote branch instruction, the content of the command is parsed and stored in operand un-format 120. This includes any data bundled into the command. The "cmd_data" instruction picks the appropriate piece of data amongst those stored at operand un-format 120, and assigns it to a local general-purpose register. The data bundled into a remote branch command is viewed as forming an array, and the parameter of "cmd_data" specifies the array index of the data to extract.

Modes of Operation

Computing systems built using processing cells can support both the synchronous VLIW and the asynchronous MIMD modes of parallel execution. That is, embodiments of the invention allow control of branching behavior such that a single logical branch may affect a common set of processing cells that work in close harmony in the manner of a VLIW architecture, or each processing cell autonomously executes branches that affect only itself in the manner of a MIMD architecture. Embodiments of the invention support spatial partitioning, i.e., partitioning the processing cells in a system into subsets, each of which operates in either the VLIW or MIMD mode. Furthermore, the assignment of processing cells to subsets can also be changed in as few as one cycle, and enables seamless switching between VLIW and MIMD modes of operation. For illustration purposes, a cluster refers to a number of processing cells.

VLIW Mode of Operation

When program tasks are known at compile time, and the target hardware operates with predictable execution time, the VLIW mode is commonly used. Under this mode of operation, the tasks, including those that run concurrently, are statically orchestrated in a synchronized manner. Because processing cells operate off clock signals that have known fixed timing relationships between them, and remote branch commands propagate and execute with predictable time, relative execution time of tasks assigned to different processing cells is statically predictable as long as operations executed in the dedicated and shared functional units take predictable time.

A cluster of processing cells operating in the VLIW mode can exchange data and share resources without using runtime synchronization. By taking advantage of static predictability of execution time, static orchestration can time the various read/write operations of a data exchange to ensure that the reader does not read prematurely. Similarly, when multiple processing cells use a shared resource such as a shared memory port, static orchestration plans the multiple accesses from different processing cells so that they do not collide, but instead occur at different, non-overlapping times.

Generally, a computation is decomposed into operations to be executed in parallel. A compiler schedules operations on to all processing cells in the VLIW cluster and their functional units, taking care that data is computed before it is used and that resources are not used for multiple purposes at the same time. Instructions are presented in parallel and in lock-step sequences across all functional units. Synchronization orchestrated at compile time is retained at run-time due to predictable execution time of each instruction and the known fixed timing relationship between the clocks of all processing cells in the VLIW cluster.

Normally, in the VLIW mode, a plurality of processing cells operates as a single logical processor and in a lock-step manner following a logical thread of execution. Each processing cell, however, may have a different program schedule. Thus, while each processing cell may have a different role to execute the program, they collaborate according to a common clock. The above examples in FIG. 4 and FIG. 6 are examples of this mode of operation. In each example, a single logical thread is mapped on to three processing cells, e.g., 310, 320, and 330. While the three processing cells 310, 320, and 330 collaborate tightly, each runs its own code.

Usually, program collaboration uses the ability to statically determine, e.g., at compile time, the relative rate of program execution on different processing cells. With this knowledge, the compiler, for example, plans execution on different processing cells so that values produced on one processing cell are made available in time for use by another processing cell. Systems with this kind of static predictability are commonly referred to as co-synchronous.

When a processing cell operates in the VLIW mode, it operates with other processing cells of the system as a single cluster. In this mode, a branch instruction generated within an originating processing cell is used to cause other processing cells within the common cluster to branch to predictable program locations that can be statically scheduled by a VLIW compiler. Since processing cells are driven by a common clock signal, the processing system can be engineered to move in lock-step harmony.

In the full VLIW mode, the system comprises only one cluster with all processing cells constituting that cluster. For example, a system with ten processing cells has one cluster, in which all ten processing cells constitute the cluster.

Systems using processing cells may also operate in multiple VLIW modes. For example, a portion of the system may be operating in a first VLIW mode and another portion may be operating in a second VLIW mode. Execution in the first portion or cluster is independent of execution in the second cluster; however, execution in each cluster is lock-step.

MIMD Moded of Operation

Normally, the MIMD mode of parallel operation is used when program tasks are difficult to predict. In the MIMD mode, a computation is divided into multiple logical threads of execution that operate asynchronously. Run-time synchronization is desirable to coordinate the different threads, such as when data is exchanged between the logical threads, or the multiple logical threads attempt to access shared resources, such as a shared memory port. Examples of traditional run-time synchronization techniques include semaphores, barriers, monitors, etc.

Generally, a MIMD computing system comprises multiple clusters of processing cells. In the full MIMD mode, each cluster comprises a single processing cell, and consequently, the number of clusters equals the number of processing cells. For example, in a system with 10 processing cells, there are 10 clusters, each with a processing cell. Each processing cell thus operates as a separate processor, generates separate branch target addresses, and can independently branch at arbitrary moments in time. In general, each cluster of a MIMD mode execution may itself comprise of multiple processing cells operating in a VLIW mode.

Processing systems using processing cells may support mixtures of both VLIW and MIMD, i.e., some processing cells operate in the MIMD mode and some other operate in the VLIW mode. The invention is not limited to the number of clusters or the number of processing cells in a cluster. For example, in a system with 10 processing cells, there are three clusters each with 3, 3, and 4 processing cells or 2, 3, and 5 processing cells, etc. Alternatively, the system may include two clusters each with 4 and 6 processing cells or 3 and 7 processing cells, etc. Within a cluster, processing cells operate in the VLIW mode with respect to each other, and, between clusters, processing cells operate in MIMD mode with respect to each other.

THIRD EXAMPLE ILLUSTRATING MIMD AND VLIW MODES OF OPERATION AND TRANSITIONING BETWEEN THE MODES

Figure 8:
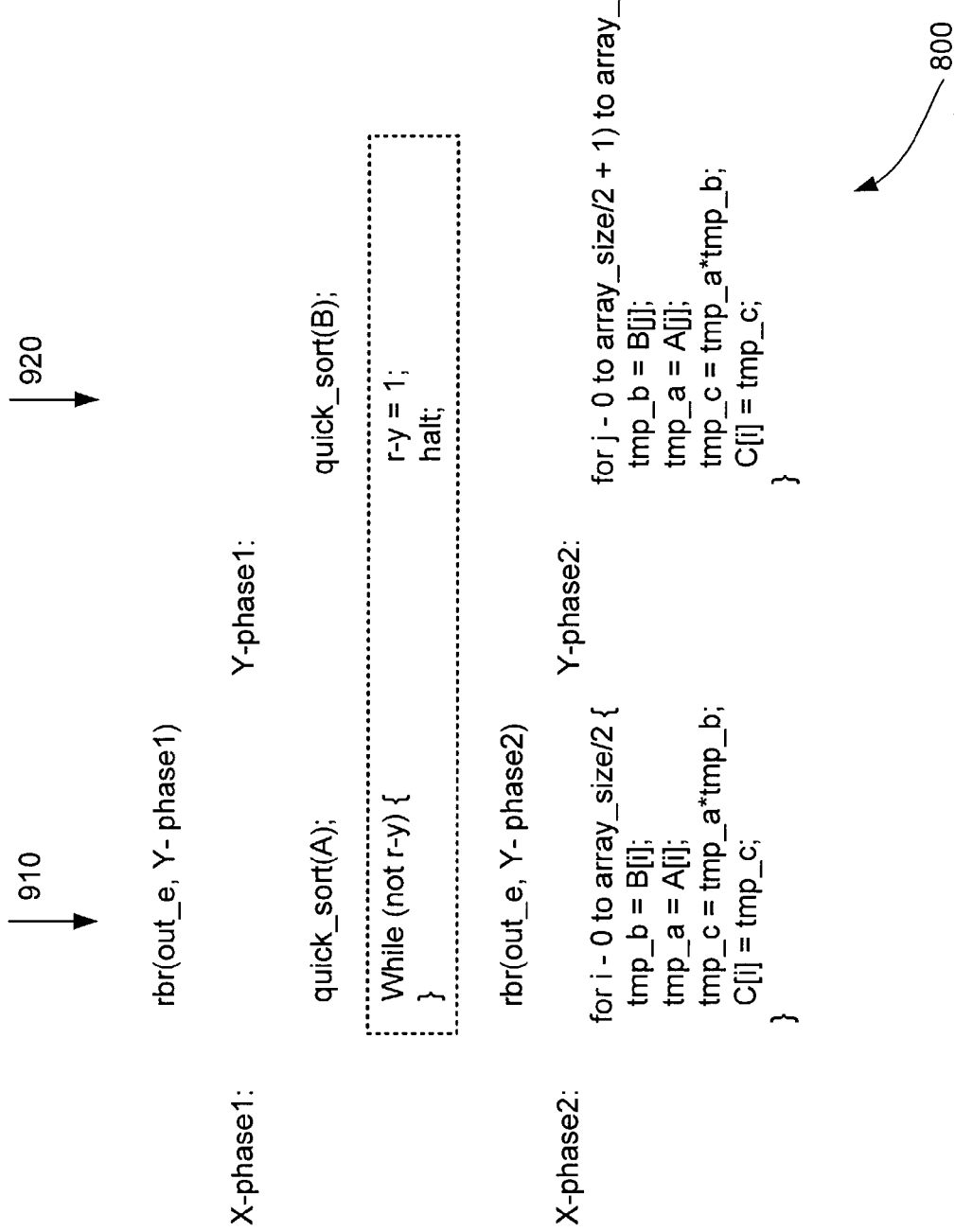
FIG. 8 shows a parallel program to be implemented in a processing system using processing cells, in accordance with an embodiment.

FIG. 8 shows a parallel program 800 that first sorts two arrays A and B, and then multiplies corresponding elements of the two arrays, leaving the results in a third array C.

Figure 9:
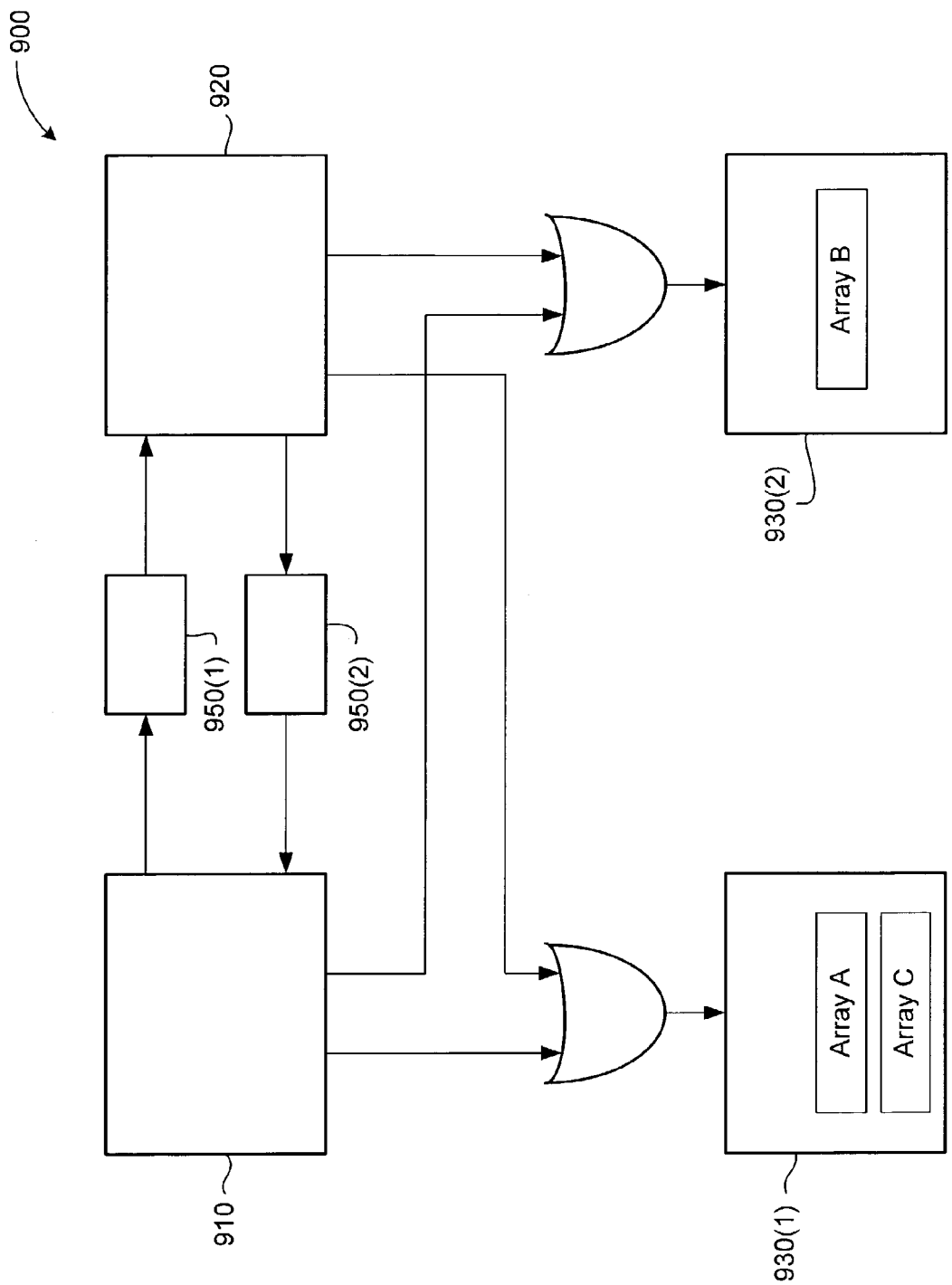
FIG. 9 shows a processing system executing the program in FIG. 8, in accordance with an embodiment.

FIG. 9 shows a processing system 900 executing program 800, in accordance with an embodiment. Processing system 900 includes two processing cells 910 and 920, two RAM blocks 930(1) and 930(2), and two synchronization registers 950(1) and 950(2). Processing cells 910 and 920 share RAM blocks 930(1) and 930(2). For illustration purposes, each RAM block 930 has one port capable of performing both read and write operations, and, in each clock cycle, each RAM block 930 performs one memory operation. Processing cells 910 and 920 sharing RAM blocks 930 seek to resolve potential access conflicts, e.g., either through static scheduling when they operate under the VLIW mode, or through dynamic synchronization when they operate under the MIMD mode. Processing cells 910 and 920 also share two synchronization registers 950(1) and 950(2). Each synchronization register 950 has a read port and a write port, each of which can be accessed once in each cycle. A write in cycle t is visible to a read performed the next cycle, e.g., t+1. A read that occurs in the same cycle t gets the value previously stored in the register. Processing cell 910 can write register 950(1) and read register 950(2), while processing cell 920 can write register 950(2) and read register 950(1).

When execution begins, arrays A and C are stored in RAM block 930(1) and array B is stored in RAM block 930(2), and initial execution occurs on processing cell 910. Computations happen in two phases. Phase one is triggered when processing cell 910 sends a remote branch command to processing cell 920 to trigger execution at Y-phase1, while execution on processing cell 910 continues sequentially into X-phase1. During phase one, the execution occurs in an MIMD mode, with each of processing cell 910 and 920 performing a quick-sort on arrays A and B, respectively. Processing cell 910 accesses RAM block 930(1) while processing cell 920 accesses RAM block 930(2) during this phase. Consequently, there is no conflict for accesses to the two RAM blocks 930. At the end of the first phase, processing cells 910 and 920 perform dynamic synchronization using synchronization register 950(2), which is initialized to zero before the beginning of phase one execution. When processing cell 910 finishes phase one execution, it repeatedly checks the value of register 950(2) until it finds a one in registers 950(2). Conversely, when processing cell 920 finishes phase one execution, it writes a one into register 950(2) and halts. When processing cell 910 finds a one in register 950(2), processing cell 910 knows that processing cell 920 has completed phase one. Processing cell 910 then initiates phase two execution by sending a remote branch command to processing cell 920.

Phase two execution adds corresponding elements of arrays A and B to produce elements of array C. Processing cell 910 performs the multiplication for elements in the first half of the arrays, while processing cell 920 performs the multiplication for elements in the second half of the arrays. Both cells 910 and 920 write their results directly into array C. The second phase execution occurs under VLIW mode and takes advantage of static scheduling of VLIW mode to statically orchestrate the memory accesses.

FIG. 10 shows a table 1000 illustrating a schedule for accessing RAM blocks 930, in accordance with an embodiment. To avoid clutter, looping details, such as loop index increment, and loop termination testing is left out. In that schedule, there is at most one memory access to RAM 930(1) in each clock cycle. Similarly, there is at most one memory access to RAM 930(2) in each clock cycle.

To achieve the schedule in FIG. 10, the code generated for processing cells 910 and 920 counts the cycles of various operations, starting from the point where processing cell 910 initiates the command rbr(out_e, Y-phase2). That is, a common reference time from which two sequences of actions and their timings are followed. No-ops are inserted in the code of processing cells 910 and 920 as appropriate so that the resulting code exhibits the relative timing as indicated in the schedule of FIG. 10 when they execute the loop to generate elements of array C by multiplying elements of arrays A and B.

The example of FIG. 9 shows an example of MIMD mode execution and how that is started from a degenerate VLIW mode of execution involving only one processing cell. The example then shows how the MIMD mode of execution ends through dynamic synchronization, and then transitions into the VLIW mode of execution involving multiple processing cells, e.g., two processing cells 910 and 920. The example also illustrates how VLIW mode of execution involves static scheduling that ensures that concurrent accesses to shared resources do not result in any conflicts.

Configuring Modes of Operation

Mode reconfiguration is generally done through program execution. For example, a single VLIW thread running on a multiple processing cell cluster might undergo a fission process. A remote branch multicasts to processing cells within the VLIW cluster may initiate execution that ends the close, synchronous collaboration between the processing cells. The example of FIG. 9 undergoes a process very similar to this as it enters phase one execution. However, in that example, the VLIW mode of execution prior to phase one was degenerated in that it utilizes only one processing cell. Those skilled in the art will recognize that other examples very similar to that in FIG. 9 can show that the initial VLIW mode of execution can utilize both processing cells 910 and 920. After dynamic reconfiguration is performed, the cluster has been divided into a plurality of processing cell clusters.

As another example, multiple threads operating on a plurality of clusters might undergo a fusion process. An example is the transition from the MIMD mode of execution into the VLIW mode of execution illustrated by the example in FIG. 9 as it transitions from phase one to phase two execution. Thus after reconfiguration is performed, the plurality of clusters are merged into a single large cluster.

In the foregoing specification, the invention has been described with reference to specific embodiments thereof. However, it will be evident that various modifications and changes may be made thereto without departing from the broader spirit and scope of the invention. Accordingly, the specification and drawings are to be regarded as illustrative rather than as restrictive.

What is claimed is:

1. A computing system, comprising:
   a plurality of processing cells including
      a first processing cell having a plurality of output ports, and
      a second processing cell having a plurality of input ports coupled to the plurality of output ports of the first processing cell;

wherein
  a remote instruction that is transmitted by the first processing cell and tat is received by the second processing cell redirects program execution of the second processing cell to an execution address sent by the first processing cell via the remote instruction;
  the remote instruction propagates from within the first processing cell to at least one selected output port of the first processing cell; and
  the selected output port is configured for transporting the remote instruction to a processing cell of the plurality of processing cells based on whether that processing cell is intended to receive that remote instruction via that selected output port.

2. The computing system of claim 1 wherein an output port of the output ports of the first processing cell is associated with a bit that controls configurations of that output port.

3. The computing system of claim 1 wherein program execution on the first processing cell and the second processing cell run on clocks with known timing relationships.

4. The computing system of claim 3 wherein execution of instructions of the first processing cell and the second processing cell is scheduled based on known timing relationships between those instructions.

5. The computing system of claim 3 wherein the first processing cell and the second processing cell operate in the very-long-instruction-word mode based on
  known timing relationship between the clocks run by the first processing cell and the second processing cell, and
  predictability of execution of instructions of the first processing cell and the second processing cell.

6. The computing system of claim 1 wherein at least one processing cell of the plurality of processing cells operates autonomously as an independent processor.

7. The computing system of claim 1 wherein a processing cell of the plurality of processing cells includes an input combiner for receiving remote instructions from at least one other processing cell and for selecting a remote instruction of the remote instructions to be propagated into the processing cell.

8. The computing system of claim 1 wherein a processing cell of the plurality of processing cells includes:
  an instruction memory that store instructions to be executed, and
  a functional unit that performs an operation in response to an instruction taken from the instruction memory.

9. The computing system of claim 8 wherein the processing cell of the plurality of processing cells further includes a lookup table that converts a target portion of a remote instruction received from at least one other processing cell to an address of the instruction memory.

10. The computing system of claim 1 wherein a processing cell of the plurality of processing cells includes:
  a state machine that manages executions of the processing cell, and
  a functional unit that performs an operation in response to control signals from the state machine.

11. The computing system of claim 1 wherein the second processing cell forwards data associated with the remote instruction to a third processing cell.

12. The computing system of claim 1 wherein:
  a portion of the plurality of processing cells is arranged into at least one cluster that comprises at least one processing cell that operates co-synchronously with other processing cells of the cluster such that execution timing relationships between processing cells of the cluster are statically predictable, and
  latencies in distributing and processing remote instructions issued from a processing cell within the cluster to another cell within the cluster is predictable, and thereby permits static scheduling of processing cells within the cluster.

13. The computing system of claim 1 wherein the plurality of processing cells is arranged in a plurality of clusters each of which operates in either a very-long-instruction-word mode or a multiple-instructions-multiple-data mode.

14. The computing system of claim 1 wherein:
  the plurality of processing cells includes a first cluster comprising a first plurality of processing cells and a second cluster comprising a second plurality of processing cells, and
  during execution of the first cluster and the second cluster, a processing cell of the first cluster is configured to be used by the second cluster.

15. A computing system comprising:
  a plurality of processing cells that are arranged in a plurality of clusters wherein program executions are synchronous within a cluster and are asynchronous between clusters;
  wherein
    a remote instruction that is issued by a first processing cell and that is received by a second processing cell redirects execution of the second processing cell to an execution address sent by the first processing cell; and
    the remote instruction propagates within the first processing cell to a selected output port of the first processing cell; and
    the selected output port is configured for transporting the remote instruction to a processing cell of the plurality of processing cells based on whether that processing cell is intended to receive the remote instruction via the selected output port.

16. A first processing cell for use in a computing system having a plurality of processing cells, comprising:
  an input combiner for receiving remote instructions from a processing cell of the plurality of processing cells;
  a lookup table for translating a virtual target name embedded in a remote instruction to a physical local target address to be used in instruction execution of the first processing cell;
  an instruction controller for controlling destinations of instructions processed by the first processing cell;
  a remote instruction generator for generating instructions for use by a second processing cell;
  at least one functional unit for processing the instructions processed by the first processing cell; and
  output ports for sending the instructions processed by the first processing cells for use by the second processing cell; wherein an output port is configured for transporting an instruction for use by the second processing cell based on whether the second processing cell is intended to receive that instruction via that output port.

17. The first processing cell of claim 16 wherein the input combiner selects a remote instruction of the remote instructions based on a priority associated with the remote instruction.

18. The first processing cell of claim 16 wherein:
  a remote instruction sent from the first processing cell to the second processing cell and a third processing cell triggers execution at a memory address of the second processing cell and at a memory address of the third processing cell; and the memory address of the second processing cell differs from the memory address of the third processing cell.

19. The first processing cell of claim 16 wherein:

the virtual target name is sent from a third processing cell to the first processing cell.

20. The first processing cell of claim 16 further comprising a latch for use in pipelining the instructions processed by the first processing cell.

21. The first processing cell of claim 16 wherein the instruction controller includes:

a program counter for keeping track of instructions to be issued;

an instruction memory for storing the instructions processed by the first processing cell; and a branch unit for determining destination and effect of an instruction for use by the second processing cell.

22. The first processing cell of claim 16 wherein the instruction controller includes a state machine for controlling operations in the first processing cell.

23. The first processing cell of claim 16 wherein:

an instruction of the instructions processed by the first processing cell is sent to the second processing cell via at least one output port of the first processing cell.

24. The first processing cell of claim 16 wherein:

an instruction processed by the first processing cell is triggered by a remote instruction received from a third processing cell via at least one output port of the third processing cell.

* * * * *

UNITED STATES PATENT AND TRADEMARK OFFICE
CERTIFICATE OF CORRECTION

PATENT NO. : 6,993,639 B2  Page 1 of 1
APPLICATION NO. : 10/405170
DATED : January 31, 2006
INVENTOR(S) : Michael S. Schlansker et al.

It is certified that error appears in the above-identified patent and that said Letters Patent is hereby corrected as shown below:

In column 6, line 1, delete "BI" and insert -- B1 --, therefor.

In column 10, line 5, delete "bb3'" and insert -- bb3'' --, therefor.

In column 11, line 34, delete "bb2'" and insert -- bb2'' --, therefor.

In column 12, line 50, delete "bb2" and insert -- bb2'' --, therefor.

In column 14, line 32, delete "Moded" and insert -- Mode --, therefor.

In column 17, line 3, in Claim 1, delete "tat" and insert -- that --, therefor.

In column 17, line 45, in Claim 8, delete "store" and insert -- stores --, therefor.

Signed and Sealed this

First Day of September, 2009

David J. Kappos
*Director of the United States Patent and Trademark Office*